Nov. 22, 1927.
C. E. F. AHLM
1,650,001
TRANSMISSION GEARING SUSPENSION
Filed Oct. 28, 1925
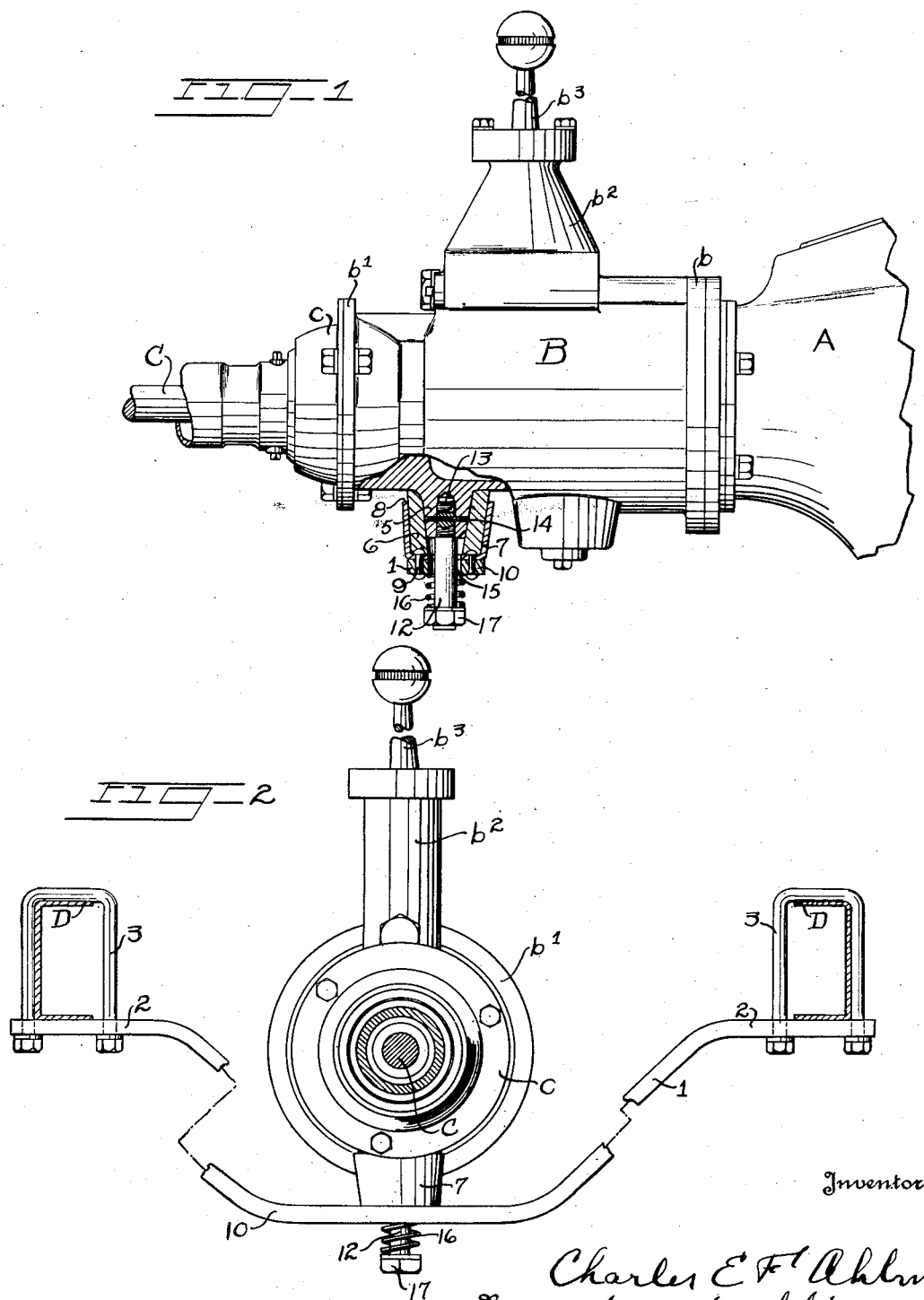
Inventor
Charles E. F. Ahlm
By Bates, Macklin,
Kolrick & Teare
Attorneys Patented Nov. 22, 1927.

1,650,001

UNITED STATES PATENT OFFICE.

CHARLES E. F. AHLM, OF EAST CLEVELAND, OHIO.

TRANSMISSION-GEARING SUSPENSION.

Application filed October 28, 1925. Serial No. 65,336.

This invention relates to transmission gearing and the primary object is to provide a simple, effective and cheaply constructed resilient support for a transmission unit.

When auxiliary transmissions are used in connection with already existing transmissions on standard types of automobiles, and are attached to the casing thereof, it is desirable that means be provided to partially support such auxiliary transmission and steady the same, relieving the strain upon the frame support for the motor and main transmission. Such already existing frame support usually comprises a three-point suspension, that is to say, the motor is provided with a central resilient front support on a cross frame member near the front of the car, and a pair of brackets rigid with the motor housing extend into engagement with the usual side frame members. Thus when the auxiliary transmission is rigid with the motor housing, considerable weight is added which unbalances the weight on the three-point suspension and also places a severe load on the main transmission and the motor casing.

The need for extra support for an auxiliary transmission attached to the motor casing is very pronounced when a torque tube is provided connecting between the rear axle housing and the auxiliary transmission. Such torque tube normally acts as a lever pivoted coaxially with the driving axle, and when driving the car forwardly, the forward end of the tube is thrust upwardly by reason of power being applied to thrust the teeth of the ring gear which are in engagement with the pinion on the propeller shaft downwardly. When the car is driving in reverse, the thrust of the forward end of the torque tube is of course in an opposite direction or downwardly. A similar condition exists when the brake is applied to the propeller shaft (as in the Ford transmission) the result being the same as in reverse drive since the ring gear continues to exert force in a downward direction on the pinion until the car comes to a stop.

It is apparent that when the effective lever arm represented by the torque tube is shortened, by securing an auxiliary transmission to the motor casing and providing a universal joint between the transmission and the shortened tube, the force of the upward or downward thrust is considerably increased while the added weight of the auxiliary transmission still further increases the intermittent or pounding load to be absorbed by the motor casing and its suspension.

A further object therefore, is to provide a support which will cushion the auxiliary transmission against upward and downward jolts while limiting the rebound or excessive upward movement. A still further object is to provide a support which will serve as well to resiliently absorb sideward jolting movement due to inertia.

Further objects and features of the invention will appear in the description to follow which relates to the accompanying drawings, wherein I show my preferred embodiment. The essential novel characteristics are summarized in the claims.

In the drawings, Fig. 1 is a side elevation of an auxiliary transmission and a portion of the already existing transmission to which it is shown attached, a portion of the propeller shaft and its housing, parts of my suspension being shown in cross section; Fig. 2 is a transverse section taken through the propeller shaft and showing my suspension in side elevation.

In the embodiment shown, the support consists of a bar having a depressed intermediate portion passing under the auxiliary transmission, the ends of the bar being secured in any manner to the side frame members. A device for retaining an annular resilient housing supporting cushion is shown as supported by the depressed portion of the bar and a member extends from the housing through the cushion and the bar which is provided with a spring reacting against the member and against the lower side of the bar.

Referring in detail to the drawings and indicating the various parts by suitable characters, A indicates the rear end of a main transmission housing; B, an auxiliary transmission housing having flanges $b$ and $b'$ for attaching the housing B to the transmission housing A and to the universal joint housing $c$ associated with the usual propeller shaft C. The auxiliary transmission as shown has a bracket $b^2$ for the usual gear shift operating lever $b^3$.

As shown, the suspension for the auxiliary transmission comprises a bar 1 shown as bridging the frame members D and secured thereto at its end portions 2 by means of U-bolts 3.

To adapt the transmission housing to the support, I have shown a downwardly extending boss 5 on the lower side of the housing. Surrounding this boss is an annular block or cushion 6 preferably of rubber or rubber compound. The adjacent outer and inner respective surfaces of the boss and cushion may be conical as shown to provide for a firm seating of the cushion upon the boss. Exteriorly of the block, I have shown a cup-shaped metal retaining device at 7 having a brim portion 8 which extends for a considerable distance directly in engagement with the outer walls of the cushion. This cup may be secured by rivets as shown at 9 to the central depressed portion 10 of the bar 1.

It will be seen that when for instance, the rear end of the car receives a jolt and the weight of the auxiliary transmission tends to force it downwardly, this shock will be resiliently absorbed by the cushion 6, while the three-point suspension for the motor and main transmission may function substantially as though the auxiliary transmission were not attached thereto.

To provide for rebound, as when the auxiliary transmission tends to bounce upwardly away from the bar, I have shown a stud 12 threaded into the boss 5 at 13 and held against turning movement by suitable means such as a pin 14 passing into the boss. The stud may extend through an opening 15 in the bar and cup and this opening is shown of greater diameter than the stud to allow sideward movement of the stud when the material of the cushion gives. On the lower end of the stud and reacting against the lower surface of the bar 1, I have shown a compression spring 16 which may be retained in active position by means of a nut 17 which nut also provides for adjustment of the spring.

During rebound, such as above mentioned, the stud 12 is free to move upwardly through the opening 15, thus compressing the spring against the cross bar and relieving the shock independently of the three-point suspension of the motor and main transmission.

I am aware that the invention is capable of considerable modification while employing the essential principles, and I do not, therefore, wish to limit myself to the exact form shown and described.

I claim:—

1. In combination with an automobile frame, a motor and main transmission adapted to have the usual three-point suspension on the frame, an auxiliary transmission adjacent the main transmission, a member extending transversely of the auxiliary transmission, rigid with the frame and having an opening therein, a member rigid with the auxiliary transmission and extending loosely through the opening to allow side play between the transmission and transversely extending member, a rubber ring in intimate contact with the said rigid member, a cup shaped retainer rigid with the transversely extending member and closely embracing the ring to absorb such side play, and means for restraining the movement of the said rigid member away from the transversely extending member.

2. In combination, in an automobile chassis, a transmission gearing interposed between the motor and driving axle, a cross bar connecting the side members of the frame and having a portion thereof extending adjacent said transmission, a boss extending from the transmission housing downwardly toward the cross bar, a resilient cushion member extending along the side surfaces of the boss, a member rigid with the cross bar and engaging the side surfaces of the resilient member, and means including a member rigid with the boss and extending downwardly through an opening in the cross bar and a spring retained thereon and normally reacting against said cross bar, whereby sudden lateral and vertical thrust due to movement of the transmission relative to the frame is resiliently absorbed.

3. In combination, an automobile frame, a mechanism to be supported having a housing, a member rigid with the frame and extending transversely of the housing, a conical member rigid with the housing and extending toward said first named member, an annular resilient member having inner and outer conical surfaces and surrounding said conical member, a retaining device therefor extending along the outer conical surfaces thereof and rigid with the first named member, a stud carried by the first named conical member and extending loosely through the first named member, and resilient means reacting in one direction against the said first named member and in the opposite direction against the stud for holding the adjacent conical surfaces in contact.

In testimony whereof, I hereunto affix my signature.

CHARLES E. F. AHLM.